(12) United States Patent
Hedouin et al.

(10) Patent No.: US 8,044,124 B2
(45) Date of Patent: Oct. 25, 2011

(54) ADHESION-PROMOTING AGENT FOR A THERMAL INSULATION SURFACE

(75) Inventors: Catherine Hedouin, Gouvieux (FR); Daniel Joubert, Vineuil Saint Firmin (FR); Roland Reeb, Gressy (FR)

(73) Assignee: Momentive Specialty Chemicals Inc., Columbus, OH (US)

( * ) Notice: Subject to any disclaimer, the term of this patent is extended or adjusted under 35 U.S.C. 154(b) by 68 days.

(21) Appl. No.: 12/571,878

(22) Filed: Oct. 1, 2009

(65) Prior Publication Data

US 2010/0028692 A1 Feb. 4, 2010

Related U.S. Application Data

(63) Continuation of application No. 10/579,124, filed as application No. PCT/FR2004/003082 on Dec. 1, 2004, now abandoned.

(30) Foreign Application Priority Data

Dec. 1, 2003 (FR) ...................................... 03 14074

(51) Int. Cl.
*C08G 18/77* (2006.01)

(52) U.S. Cl. ..................... 524/115; 428/423.1; 428/500; 428/537.1

(58) Field of Classification Search ................ 428/423.1
See application file for complete search history.

(56) References Cited

U.S. PATENT DOCUMENTS

| 4,260,569 A | * | 4/1981 | Hurst | 264/45.4 |
| 4,367,300 A | | 1/1983 | Aoki et al. | |
| 4,473,406 A | | 9/1984 | Bradley et al. | |
| 4,592,929 A | | 6/1986 | Benjamin et al. | |
| 5,670,578 A | * | 9/1997 | Shawl | 525/187 |
| 5,807,609 A | * | 9/1998 | Pakusch et al. | 427/244 |

FOREIGN PATENT DOCUMENTS

| GB | 822276 A | 10/1959 |
| JP | 55063255 | 5/1980 |

* cited by examiner

*Primary Examiner* — Vasu Jagannathan
*Assistant Examiner* — Doris Lee

(57) ABSTRACT

The present invention relates to a novel agent for promoting adhesion to a heat-insulating surface and in particular to a polystyrene surface, especially when wet or under the effect of a large variation in temperature. The invention also relates to the use of the said agent in a water-insoluble film-forming polymer composition or in a mineral binder composition for applications in the construction field and more particularly in external heat-insulation systems.

18 Claims, No Drawings

ADHESION-PROMOTING AGENT FOR A THERMAL INSULATION SURFACE

RELATED APPLICATION DATA

This application is a continuation of U.S. patent application Ser. 10/579,124 filed May 2, 2007, now abandoned which claims the benefit of PCT/FR04/03082 with an international filing date of Dec. 1, 2004, the entire contents of both of which are hereby fully incorporated by reference.

The present invention relates to a novel agent for promoting adhesion to a heat-insulating surface and in particular to a polystyrene surface, especially when wet or under the effect of a large variation in temperature. The invention also relates to the use of the said agent in a water-insoluble film-forming polymer composition or in a mineral binder composition for applications in the construction field and more particularly in external heat-insulation systems.

In general, polystyrene-based materials are increasingly incorporated in the construction of new buildings, in particular in Europe.

For example, covering components made of insulating material, for instance polystyrene such as extruded or expanded polystyrene or polyurethane constitute a support material for laying ceramic tiles in a thin-bed process.

In addition, building components made of polystyrene materials are suitable for interrupting thermal bridges, such as those appearing, for example, where concrete or masonry meet.

The application of panels of polystyrene-based materials to building façades, for the purpose of heat insulation, is also used.

One common method consists, in the case of heat insulation, in fixing onto the facade (for example made of masonry, concrete, mineral rendering, etc.) the back of the polystyrene insulating panels or another insulating material made of mineral wool using a mortar or a cement. A mortar is also applied to the front face of the polystyrene insulating panels or another insulating material made of mineral wool, as a reinforcing rendering. This serves especially for the inclusion of fibre reinforcements (for example reinforcements made of glass fibre, polyester or polypropylene), which are used to reinforce the mechanical properties of the external heat-insulating system. Next, a reinforcing rendering is usually applied again to the glass fibre trellis, for the total inclusion of the trellis, the surface is evened out and, after drying, a finish covering is applied, for example a mineral rendering or a covering based on synthetic resin, such as a roughcast, or a paint.

In general, according to the foregoing, there is an increasing problem of obtaining a permanent adhesive bond between materials based on insulators and in particular based on polystyrene, and mineral building materials. In particular, this adhesion should be satisfactory even under the effect of humidity or of a large variation in temperature.

The drawback of the known mineral building materials is that their adhesion to heat-insulating materials and in particular to polystyrene-based materials, after consolidation, is unsatisfactory.

Document EP 0 698 586 has disclosed the possibility of using an additive based on aromatic polyether to improve the adhesion of mineral building materials to polystyrene-based materials. However, these compounds have the drawback especially of not sufficiently improving the wet adhesion and of not sufficiently reducing the water uptake by capillary action.

One of the aims of the present invention is to provide mineral building materials that show, after consolidation, increased adhesion, when wet or under the effect of a large variation in temperature, to heat-insulating materials and in particular to polystyrene-based materials.

This aim and others are achieved by the present invention, one subject of which is a novel agent for promoting adhesion to a heat-insulating surface and in particular to a polystyrene surface, especially when wet or under the effect of a large variation in temperature, based on a phosphate monoester, diester or triester or a mixture thereof.

A subject of the invention is also a water-insoluble film-forming polymer composition comprising a phosphate monoester, diester or triester or a mixture thereof.

A subject of the invention is also the use of a water-insoluble film-forming polymer composition comprising a phosphate monoester, diester or triester or a mixture thereof, as adhesion primer on a heat-insulating support and in particular a polystyrene-based support.

A subject of the invention is also a mineral binder composition comprising a phosphate monoester, diester or triester or a mixture thereof.

A subject of the invention is also the use of the mineral binder composition to increase the adhesion of a heat insulator and in particular of polystyrene to a support material.

A subject of the invention is also a process for increasing the adhesion properties to a heat-insulating support and in particular a polystyrene support, especially when wet or under the effect of a large variation in temperature, after consolidation, of a hydraulic mineral binder composition, characterized in that a sufficient amount of at least one phosphate monoester, diester or triester or a mixture thereof is added to the said composition.

A first subject of the invention is thus a novel agent for promoting the adhesion to a heat-insulating surface and in particular a polystyrene surface, especially when wet or under the effect of a large variation in temperature, based on a phosphate monoester, diester or triester or a mixture thereof.

The term "heat-insulating support" especially means polystyrene, polyurethane and mineral wools such as glass wool or rock wool. Polystyrene is preferred.

The phosphate monoesters, diesters or triesters of the invention may be in particular compounds corresponding to formula (I) below:

$$O=P(OR1)(OR2)(OR3) \qquad (I)$$

in which:

R1, R2 and R3, which may be identical or different, represent:
- a hydrogen atom, or
- a linear, branched or cyclic, saturated or unsaturated alkyl radical containing from 1 to 22 carbon atoms, preferably from 2 to 12 carbon atoms and even more preferentially from 2 to 8 carbon atoms, optionally substituted with halogen atoms, such as fluorine or chlorine, hydroxyl groups, ether groups containing between 1 and 12 carbon atoms and preferably between 1 and 6 carbon atoms, thioether groups, ester groups, amide groups, carboxyl groups, sulfonic acid groups, carboxylic anhydride groups and/or carbonyl groups, or
- an aryl radical containing from 6 to 22 carbon atoms and preferably from 6 to 8 carbon atoms, optionally substituted with halogen atoms, such as fluorine or chlorine, hydroxyl groups, ether groups containing between 1 and 12 carbon atoms and preferably between 1 and 6 carbon atoms, thioether groups, ester groups, amide groups, carboxyl groups, sulfonic acid groups, carboxylic anhydride groups and/or carbonyl groups, it being understood that at least one of the substituents R1, R2 or R3 is other than a hydrogen atom.

Among the phosphate monoester, diester or triester compounds of formula (I), mention may be made of the following compounds:

tris(2-ethylhexyl)phosphate,
tris(2-butoxyethyl)phosphate,
di(2-ethylhexyl)phosphate,
mono(2-ethylhexyl)phosphate,
tris(2-isooctyl)phosphate,
tricresyl phosphate,
cresyl diphenyl phosphate,
trixylyl phosphate
triphenyl phosphate,
tributyl phosphate,
triethyl phosphate,
tris(2-chloroethyl)phosphate, or a mixture thereof.

The phosphate monoester, diester or triester of the agent according to the invention may be incorporated in liquid form or in the form of a solid powder in a water-insoluble film-forming polymer composition or in a mineral binder composition.

If the phosphate monoester, diester or triester of the invention is in liquid form at room temperature, as is the case for the particular compounds listed above with the exception of triphenyl phosphate, which is solid at room temperature, it is possible to adsorb them onto an inert mineral support to obtain a solid powder.

The adsorption of the phosphate monoester, diester or triester may be performed via any conventional process for the adsorption of compounds onto inorganic mineral supports. Mention may be made especially of the processes described in documents FR 74 27893 or FR 74 36083.

One preferred embodiment for preparing the solid phosphate monoester, diester or triester powder is a process comprising a step of dry impregnation of a mineral oxide with a sufficient amount of phosphate monoester, diester or triester.

The mineral oxide may be chosen from silica, alumina, silica-alumina, sodium silicoaluminate, calcium silicate, magnesium silicate, zirconia, magnesium oxide, calcium oxide, cerium oxide and titanium oxide. The mineral oxide may be partially or totally hydroxylated or carbonated.

The mineral oxide should have a large porosity. This means that its total pore volume should be at least 1 ml/g and preferably at least 2 ml/g.

The total pore volume of the mineral oxide is measured via a mercury porosimetry method using a Micromeritics Autopore III 9420 porosimeter.

The preparation of each sample is performed as follows: the sample is predried for 2 hours in an oven at 200° C. The measurements are then taken according to the procedure described in the manual supplied by the manufacturer.

The pore diameters are calculated by means of the Washburn relationship with a head contact angle equal to 140° and a gamma surface tension equal to 485 dynes/cm.

Preferably, the mineral oxide has a working pore volume of greater than or equal to 0.5 ml/g. The term "working volume" means the volume of the pores with a diameter of less than 1 micron. This volume is measured via the same method as the total pore volume.

A silica is preferably used as mineral oxide. Even more preferentially, an amorphous silica is used. This may be a natural silica or a synthetic silica, for instance silica gels, combustion silicas or, very preferably, precipitated silicas.

When the mineral oxide is precipitated silica, it may be, for example, a Tixosil 38A, Tixosil 38D or Tixosil 365 silica from the company Rhodia.

In particular, the precipitated silica may be in the form of substantially spherical beads, especially with a mean size of at least 80 microns, for example of at least 150 microns, obtained using a nozzle sprayer, as described, for example, in document EP 0018866. It may be, for example, the silica known as Microperle. This form makes it possible to optimize the impregnation capacity and the flowability of the powder, as described, for example, in document EP 0 966 207 or EP 0 984 772. It may be, for example, a Tixosil 38X or Tixosil 68 silica from the company Rhodia.

This makes it possible especially to obtain a phosphate monoester, diester or triester powder that flows well and does not produce dust.

The precipitated silica may be a highly dispersible silica, for instance the silicas described in documents EP 0 520 862, WO 95/09127 or WO 95/09128, which, in particular, facilitates its dispersion in the water-insoluble film-forming polymer composition or in the mineral binder composition. It may be, for example, a Z1165 MP or Z1115 MP silica from the company Rhodia.

The amorphous silica may be a silica with a low water uptake. The "water uptake" corresponds to the amount of water incorporated into the sample relative to the dry mass of the sample, after 24 hours at 20° C. and 70% relative humidity. The term "low water uptake" means a water uptake of less than 6% and preferably less than 3%. These may be the precipitated silicas described in patent application FR 01 16881 (in the name of the company Rhodia), pyrogenic silicas or silicas that have been partially dehydroxylated by calcinations or by surface treatment.

A subject of the invention is also a water-insoluble film-forming polymer composition comprising a phosphate monoester, diester or triester or a mixture thereof.

This composition may be in the form of an aqueous dispersion of water-insoluble film-forming polymer (latex) or in the form of a redispersible latex powder. The term "redispersible latex powder" means a latex powder that is redispersible in water.

The process for preparing this composition consists in mixing a phosphate monoester, diester or triester or a mixture thereof with a water-insoluble film-forming polymer (latex).

This mixture of the phosphate monoester, diester or triester and of the latex may be prepared in the form of a mixture of solid phosphate monoester, diester or triester powder with a redispersible latex powder composition.

It is also possible to introduce the phosphate monoester, diester or triester into the latex during the polymerization or after polymerization. The supplemented latex in the form of an aqueous dispersion may thus be obtained.

Drying of the aqueous dispersion thus obtained may also be performed in order to obtain a redispersible latex powder supplemented with phosphate monoester, diester or triester.

It is also possible to add the phosphate monoester, diester or triester in powder form to the spraying tower of the latex, i.e. at the time of drying of the latex.

Among all these possible forms of mixtures, the case in which the phosphate monoester, diester or triester is introduced into an aqueous dispersion of film-forming polymer (latex) after polymerization is preferred. The latex may then be dried.

The amount of phosphate monoester, diester or triester added to the water-insoluble film-forming polymer should be sufficient to give the water-insoluble film-forming polymer composition good properties of adhesion to polystyrene, even when wet.

The amount of phosphate monoester, diester or triester added to the water-insoluble film-forming polymer is then generally between 0.02% and 25% by weight of phosphate monoester, diester or triester relative to the weight of the dry latex.

This amount is preferably between 0.5% and 8% by weight of phosphate monoester, diester or triester relative to the weight of the dry latex.

Even more preferentially, this amount is between 1% and 5% by weight of phosphate monoester, diester or triester relative to the weight of the dry latex.

Water-insoluble polymers that are particularly suitable are homopolymers or copolymers in the form of an aqueous dispersion or that may be converted into an aqueous dispersion, and can then be converted into powder by spray-drying.

The mean particle size of the powder is preferably from 10 to 1000 µm, more preferably from 20 to 700 µm and particularly from 50 to 500 µm.

The preferred water-insoluble polymers are obtained by polymerization of monomers chosen from:
vinyl esters and more particularly vinyl acetate;
alkyl acrylates and methacrylates, the alkyl group of which contains from 1 to 10 carbon atoms, for example methyl, ethyl, n-butyl or 2-ethylhexyl acrylate or methacrylate;
vinylaromatic monomers, in particular styrene.

These monomers may be copolymerized together or with other ethylenically unsaturated monomers, to form homopolymers, copolymers or terpolymers.

As non-limiting examples of monomers that are copolymerizable with vinyl acetate and/or acrylic esters and/or styrene, mention may be made of ethylene and olefins, for instance isobutene or α-olefins containing from 6 to 20 carbon atoms and preferably from 8 to 14 carbon atoms; vinyl esters of branched or unbranched saturated monocarboxylic acids containing from 1 to 16 carbon atoms, for instance vinyl propionate, vinyl "Versatate" (registered brand name for branched $C_9$-$C_{11}$ acid esters) and in particular for the vinyl neodecanoate known as Veova 10, vinyl pivalate, vinyl butyrate, vinyl 2-ethylhexylhexanoate or vinyl laurate; esters of unsaturated monocarboxylic or dicarboxylic acids containing from 3 to 6 carbon atoms with alkanols containing 1 to 10 carbon atoms, for instance methyl, ethyl, butyl or ethylhexyl maleate or fumarate; vinylaromatic monomers such as methylstyrenes and vinyltoluenes; vinyl halides such as vinyl chloride or vinylidene chloride; diolefins, particularly butadiene; (meth)allylic esters of (meth)acrylic acid, (meth)allylic esters of maleic, fumaric, crotonic and itaconic acid monoesters and diesters, and also alkene derivatives of acrylic and methacrylic acid amides, such as N-methallylmaleimide.

It is especially possible to choose at least 2 copolymerizable monomers of different nature to obtain a terpolymer.

An example that may be mentioned is a terpolymer of vinyl acetate/vinyl versatate/dibutyl maleate type.

It is also possible to add to the monomers that are copolymerizable with vinyl acetate and/or acrylic esters and/or styrene at least one other monomer chosen from the following list:
acrylamide, ethylenically unsaturated carboxylic acids or diacids, preferably acrylic acid, methacrylic acid or crotonic acid, ethylenically unsaturated sulfonic acids and salts thereof, preferably vinylsulfonic acid or 2-acrylamido-2-methylpropanesulfonic (AMPS) acid, or sodium methallylsulfonate;
crosslinking monomers bearing at least two ethylenic unsaturations, such as diallyl phthalate, diallyl maleate, allyl methacrylate, triallyl cyanurate, divinyl adipate or ethylene glycol dimethacrylate;
monomers with silane functions such as vinyltrimethoxysilane or vinyltriethoxysilane.

These monomers are added in an amount generally of between 0.05% and 10.0% by weight relative to the total weight of the monomers. These monomers are added during the polymerization.

Generally, the polymerization of the monomers is performed in an emulsion polymerization process in the presence of an emulsifier and/or of a protective colloid, and of a polymerization initiator.

The monomers used may be introduced as a mixture or separately and simultaneously into the reaction medium, either before the start of the polymerization in one go, or during the polymerization in successive fractions or continuously.

The emulsifiers that may be used are anionic, cationic or nonionic emulsifiers.

They are generally used in a proportion of from 0.01% to 5% by weight relative to the total weight of the monomers.

Emulsifiers generally used include standard anionic agents represented especially by alkyl sulfates, alkyl sulfonates, alkylaryl sulfates, alkylaryl sulfonates, aryl sulfates, aryl sulfonates, sulfosuccinates, alkali metal alkyl phosphates, and salts of hydrogenated or non-hydrogenated abietic acid.

The emulsion polymerization initiator is more particularly represented by hydroperoxides such as hydrogen peroxide, cumene hydroperoxide, diisopropylbenzene hydroperoxide, para-menthane hydroperoxide or tert-butyl hydroperoxide, and persulfates such as sodium persulfate, potassium persulfate or ammonium persulfate. It is used in an amount generally of between 0.05% and 3% by weight relative to the total weight of the monomers. These initiators are optionally combined with a reducing agent, such as sodium bisulfite, hydrogen sulfite or thiosulfate, sodium formaldehydesulfoxylate, polyethyleneamines, sugars (dextrose or saccharose), ascorbic acid or isoascorbic acid, or metal salts. The amount of reducing agent used usually ranges from 0 to 3% by weight relative to the total weight of the monomers.

The reaction temperature, which depends on the initiator used, is generally between 0 and 100° C. and preferably between 30 and 90° C.

A transfer agent may be used in proportions ranging from 0 to 3% by weight relative to the monomer(s), generally chosen from mercaptans such as N-dodecyl mercaptan, tert-dodecyl mercaptan and 2-mercaptoethanol, allylic derivatives such as allyl alcohol, cyclohexene, and halogenated hydrocarbons such as chloroform, bromoform and carbon tetrachloride. It allows the length of the molecular chains to be regulated. It is added to the reaction medium either before the polymerization or during polymerization.

Protective colloids may also be used, at the start, during or after polymerization.

The protective colloids that are particularly suitable are polyvinyl alcohols and derivatives thereof, for example vinyl alcohol/vinyl acetate copolymers, modified polyvinyl alcohols comprising reactive functions such as silanols, mercaptans, amines and formamides, and comprising hydrophobic comonomers such as ethylene, vinyl versatate, vinyl 2-ethylhexylhexanoate, polyvinylpyrrolidones (PVP), polysaccharides, for example starches (amylose and amylopectin), cellulose, cellulose ethers, for instance hydroxyethylcellulose, guar, tragacantic acid, dextran, alginates and carboxymethyl, methyl, hydroxyethyl or hydroxypropyl derivatives thereof, proteins, for example casein, soybean proteins, gelatines, synthetic polymers, for example poly(meth)acrylic acid, poly (meth)acrylamide, polyvinylsulfonic acids, and water-soluble copolymers thereof, melamine-formaldehyde sulfonates, naphthalene-formaldehyde sulfonates, styrene/maleic acid copolymers, and vinyl ether/maleic acid copolymers. Polyvinyl alcohol is particularly preferred as protective colloid for the polymerization. A particular protective colloid used is a polyvinyl alcohol with a degree of polymerization of from 200 to 3500 and a degree of hydrolysis of from 80 mol % to 99 mol % and preferably from 86 mol % to 92 mol %.

The protective colloids are added in proportions of between 0.5% and 15% by weight relative to the total weight of the monomers and preferably between 2% and 10% by weight relative to the total weight of the monomers.

In one particularly preferred embodiment, the latex composition supplemented with phosphate monoester, diester or triester in the form of a redispersible powder comprises from 0 to 35% by weight and preferably 3% to 15% by weight of protective colloid relative to the total weight of the water-insoluble polymer.

The protective colloids that are particularly suitable are the same as those mentioned above.

The preferred anticaking agents are aluminium silicates, calcium carbonates, magnesium carbonates or mixtures thereof, silicas, hydrated alumina, bentonite, talc, or mixtures of dolomite and talc, or of calcite and talc, kaolin, barium sulfate, titanium oxide or calcium sulfoaluminate (satin white).

The particle size of the anticaking agents is preferably between 0.001 and 0.5 mm.

The water-insoluble film-forming polymer composition comprising a phosphate monoester, diester or triester or a mixture thereof may also comprise a water repellent chosen from fatty acids or salts thereof such as calcium, magnesium or sodium stearate, or sodium laurate, and fatty acid esters such as those described in document WO 01/90023 (MBT).

Particular water repellents that may be mentioned include methyl esters of C10-C16 fatty acids (containing from 10 to 16 carbon atoms), for instance those sold under the brand name Estorob 1214 by the company Novance, the methyl ester of erucic acid, the methyl ester of linoleic acid, the ethylhexyl ester of lauric acid, the butyl ester of oleic acid, the ethylhexyl ester of oleic acid or the methyl ester of oleic acid.

Preferably, the water-insoluble film-forming polymer composition comprising a phosphate monoester, diester or triester or a mixture thereof comprises, as particularly advantageous water repellent, the methyl ester of a C10-C16 fatty acid.

This water-insoluble film-forming polymer composition comprising a phosphate monoester, diester or triester or a mixture thereof especially has the advantage of being able to be used as such or in combination with other additives, for instance adhesion primer on a support made of a heat insulator and in particular on a polystyrene support.

Thus, a subject of the invention is also the use of the water-insoluble film-forming polymer composition comprising a phosphate monoester, diester or triester or a mixture thereof as adhesion primer on a support made of a heat insulator and in particular a polystyrene support.

This water-insoluble film-forming polymer composition comprising a phosphate monoester, diester or triester or a mixture thereof also has the advantage of reducing the glass transition temperature (Tg) and the minimum film-forming temperature (MFFT) of the non-supplemented water-insoluble film-forming polymer (latex).

A subject of the invention is also a mineral binder composition comprising a phosphate monoester, diester or triester or a mixture thereof.

The mineral binders may be aerial binders or hydraulic binders. The term "aerial binder" means plaster-based binders.

The hydraulic mineral binders may be chosen from cements, which may be of Portland, aluminous or blast-furnace type. Other compounds often added as additives to the cement also have hydraulic properties, for instance fly ash and calcined shales. Mention may also be made of pozzolans which react with lime and form calcium silicates.

The mineral binders are generally manufactured from natural materials that are treated at very high temperature to remove the water and convert the materials into mineral compounds capable of reacting with water to produce a binder, which, after drying, forms a compact mass with good mechanical properties.

The mineral binders may be in the form of grouts, mortars or concretes; thus, fine or coarser granulates, such as sand or pebbles, are thus generally added during the puddling with water.

The phosphate monoester, diester or triester may be added directly to the building composition, in an amount that may be between 0.01 % and 50% by dry weight of the phosphate monoester, diester or triester relative to the total weight of the building composition.

Preferably, this amount is between 0.05% and 20% by dry weight of phosphate monoester, diester or triester relative to the total weight of the building composition.

Even more preferentially, this amount is between 0.02% and 2% by dry weight of phosphate monoester, diester or triester relative to the total weight of the building composition.

The phosphate monoester, diester or triester may also be premixed in a sufficient amount with a water-insoluble film-forming polymer in the form of an aqueous dispersion (latex) or in the form of a redispersible latex powder before being added to the mineral binder composition.

The binder composition thus comprises, besides the said phosphate monoester, diester or triester, at least one water-insoluble film-forming polymer.

The amounts of phosphate monoester, diester or triester or mixture thereof generally introduced into the water-insoluble film-forming polymer compositions are the same as those indicated above.

The redispersible latex powder supplemented with phosphate monoester, diester or triester used may be of very varied nature.

A latex composition in the form of a redispersible powder comprising:
at least one water-insoluble polymer,
from 0 to 35% by weight and in particular from 3% to 15% by weight, relative to the total weight of the polymer, of at least one protective colloid,
from 0 to 30% by weight and in particular from 1% to 12% by weight, relative to the total weight of the polymer, of an anticaking agent, and
from 0.02% to 25% by weight and in particular from 0.5% to 8% by weight, relative to the total weight of the polymer, of phosphate monoester, diester or triester,
is particularly preferred.

The redispersible latex powder supplemented with phosphate monoester, diester or triester is preferably prepared by spray-drying the aqueous polymer dispersion. This drying may be performed in conventional spray-drying systems, using atomization by means of simple, twin or multiple liquid nozzles or a rotary disc. The selected product outlet temperature is generally in the range from 50 to 100° C. and preferably from 60 to 90° C., depending on the system and on the desired glass transition temperature of the latex and the desired degree of drying.

In order to increase the stability on storage and the flowability of the redispersible latex powder, it is preferable to introduce an anticaking agent into the spraying tower together with the aqueous polymer dispersion, which results in a preferable deposition of the anticaking agent onto the particles of the dispersion.

The mineral binder composition thus obtained has, after consolidation, good properties of adhesion to heat insulators and in particular to polystyrene, especially when wet or under the effect of a large variation in temperature.

It also has good water-repellency properties and a reduction in water uptake by capillary action.

Besides the mineral constituents, the mineral binder compositions may also comprise organic additives, for example hydrocolloids such as cellulose ethers or guars, plasticizers, water repellents such as those mentioned previously in the water-insoluble film-forming polymer compositions, mineral or organic fibres such as fibres of polypropylene, polyethylene, polyamide, cellulose or crosslinked polyvinyl alcohol type, or a mixture thereof.

The mineral binder composition may also comprise mineral or organic dyes. This is the case in particular when this mineral binder composition is used as a finishing coat.

The mineral binder composition may also comprise any additive usually used in mineral binder compositions.

The composition according to the invention, especially the mineral binder composition according to the invention, may also comprise a silicone, preferably chosen from polyorganosiloxanes, in particular polyorganosiloxanes that are liquid at room temperature. This silicone may be introduced after polymerization, or in the form of powder.

A subject of the invention is also a process for increasing the properties of adhesion to a heat insulator and in particular to polystyrene, especially when wet or under the effect of a large variation in temperature, after consolidation, of a mineral binder composition, characterized in that a sufficient amount of at least one phosphate monoester, diester or triester or a mixture thereof is added to the said composition.

A subject of the present invention is also the use of this mineral binder composition to increase the adhesion of a heat insulator and in particular of polystyrene to a support material.

The support materials may be composed of concrete, bricks, cellular concrete, agglomerated concrete (breeze block), fibrocement, masonry or wall rendering.

Other advantages of the compositions or processes of the invention are indicated in the examples that follow, which are given as non-limiting illustrations.

The proportions and percentages indicated in the examples are on a weight basis, unless otherwise indicated.

The particle sizes (d50) are measured using a Coulter LS 230 laser scattering granulometer.

EXAMPLES

Description of the Tests
1—Test of Adhesion to Polystyrene

Mortar is spread onto the insulator to a thickness of 3 mm 15 minutes after puddling. After drying the mortar for 28 days (at 23±2° C. and 50±5% RH (relative humidity)), eight circles 50 mm in diameter are cut out of the mortar down to the insulator, using a borer. Round metal pellets of appropriate size are attached to these areas using an araldite adhesive.

The peel test is performed under the following conditions:
  without additional conditioning (in the dry state),
  after immersing the mortar in water for 2 days and drying for 2 hours (at 23±2° C. and 50±5% RH).

The mean peel value is based on the results of eight tests. The individual and mean values are recorded and the results expressed as MPa.

2—Test of Water Uptake by Capillary Action on Stone

Three ceramic tiles are prepared for each formulation.

The rendering (thickness 3 mm) is applied using a trowel to one face of the ceramic tile. The ceramic tile thus prepared is conditioned for 28 days (at 23±2° C. and 50±5% RH). The side faces of the ceramic tile are made waterproof so as to ensure that only the face covered with the coat of rendering is subjected to water uptake during the test.

The face covered with the ceramic tile rendering is placed in contact with a sponge (a filter paper is placed beforehand between the ceramic tile and the sponge) placed in a tank containing water.

The ceramic tiles are weighed before immersion (reference weight) and then after 30 minutes, 1 hour, 2 hours, 4 hours, 6 hours and 24 hours. Before the second and the subsequent weighings, the surface of the ceramic tiles is wiped using an absorbent paper.

The calculation is directed towards determining the mean water uptake per square metre over time.

Example 1

Preparation of a Latex Emulsion Supplemented with a Vinyl Acetate/Vinyl Neodecanoate Copolymer (Sold Under the Brand Name Veova 10 by the Company Resolution) and with tris(2-butoxyethyl)phosphate A latex composed of a copolymer of vinyl acetate/vinyl versatate composed of 50% vinyl acetate and 50% vinyl versatate (Veova 10) by weight is used as control binder. This latex is synthesized via an emulsion polymerization process using polyvinyl alcohol with a degree of hydrolysis of about 88% as protective colloid and potassium persulfate as free-radical initiator.

The characteristics of this latex:

| | |
|---|---|
| Dry extract: | 50.73% |
| pH: | 4.7 |
| MFFT: | 7.6° C. |
| Tg: | 16° C. |
| Brookefield viscosity at 50 rpm: | 2420 mPa · s. |
| Granulometry: d50: | 2 µm |
| Additive: | Amgard TBEP (Rhodia) = tris(2-butoxyethyl) phosphate (CAS = 78-51-3) |
| Physical form: | liquid |

Preparation of the Latex Forming the Subject of the Invention 801.7 grams of control latex are introduced into a 1-litre reactor equipped with an anchor-type stirrer. This latex is heated to a temperature of between 60 and 70° C., and 16.3 grams of Amgard TBEP are added over a period of about 20 minutes. After the end of addition of the Amgard TBEP, the mixture is maintained at this temperature for a further 20 to 30 minutes and is then cooled to room temperature.

This latex may then be formulated in its present form or may be atomized in the presence of an anticaking agent (for example kaolin or silica) to obtain a water-redispersible powder.

Characteristics of the Latex Forming the Subject of the Invention

| Content of Amgard TBEP/dry latex: | 4% |
|---|---|
| Dry extract: | 51.91% |
| pH: | 4.7 |
| MFFT: | 0° C. |
| Tg: | 7° C. |
| Brookfield viscosity at 50 rpm: | 2068 mPa · s |
| Granulometry: d50: | 2 μm |

Composition of the Formulation of the Rendering Used for Bonding and the Polystyrene-based Rendering

| Grey cement CPA CEMI 42.5: | 600 g |
|---|---|
| Sand HN38 (0.4-4 mm) | 1296 g |
| Cellulose ether Culminal 9101: | 1 g |
| Cellulose ether Culminal 9104: | 3 g |
| Lime: | 40 g |
| Latex emulsion supplemented with Amgard TBEP: | 115.6 g |
| Grey cement CPA CEMI 42.5: | 600 g |
| Sand HN38 (0.4-4 mm) | 1296 g |
| Cellulose ether Culminal 9101: | 1 g |
| Cellulose ether Culminal 9104: | 3 g |
| Lime: | 40 g |
| Control latex emulsion: | 118.3 g |

Water/powder ratio = 0.22

Physicochemical Properties of the Control and Supplemented Emulsions

TABLE 1

| Reference | Viscosity | Tg | MFFT |
|---|---|---|---|
| Control latex | 2436 mPa · s | 16° C. | 7.6° C. |
| Control latex supplemented with Amgard TBEP (4%) | 2068 mPa · s | 7° C. | 0° C. |

The addition of the phosphate ester is reflected by a plasticizing effect on the polymer, with a consequent large drop in its Tg (glass transition temperature) and in its MFFT (minimum film-forming temperature).

Test of Adhesion to Polystyrene of the Supplemented Control Latex

The results of the test of adhesion to polystyrene of the control latex supplemented with Amgard TBEP are given in Table 2.

TABLE 2

| Reference | Adhesion 28 days (N/mm$^2$) | Adhesion 28 days + 2 days in water (N/mm$^2$) |
|---|---|---|
| Control emulsion | 0.012 | 0.045 |
| Control emulsion supplemented with Amgard TBEP | 0.012 | 0.063 |

The mortar containing the control latex supplemented with Amgard TBEP has an adhesion to polystyrene (0.065 N/mm$^2$) after immersion in water for 2 days and drying for 2 hours (at 23° C.±2° C.) higher than the mortar containing the non-supplemented control latex (0.045 N/mm$^2$).

Test of Water Uptake by Capillary Action on Stone of the Supplemented Control Latex The results of the test of water uptake by capillary action on stone of the control latex supplemented with Amgard TBEP are presented in Table 3.

TABLE 3

| Time h$^{1/2}$ | Control emulsion Water absorption (kg/m$^2$) | Control emulsion supplemented with Amgard TBEP Water absorption (kg/m$^2$) |
|---|---|---|
| 0.7 | 0.31 | 0.54 |
| 1 | 0.43 | 0.73 |
| 1.41 | 0.87 | 1.18 |
| 2 | 5.41 | 2.46 |
| 2.45 | 9.95 | 3.52 |
| 4.9 | 18.05 | 10.37 |

The amount of water adsorbed by capillary action measured after 24 hours is less in the case where the mortar contains the control latex supplemented with Amgard TBEP (7.1 kg/m$^2$) compared with the mortar containing the control latex (18.3 kg/m$^2$).

Example 2

Amgard TOF=tris(2-ethylhexyl)phosphate (CAS 1806-54-8) sold by the company Rhodia.

Amgard TBEP=tris(2-butoxyethyl)phosphate (CAS 78-51-3) sold by the company Rhodia.

Physical form: liquid

Preparation of Latex Powders Forming the Subject of the Invention

A latex composed of a vinyl acetate/vinyl versatate copolymer with a weight composition of 50% vinyl acetate and 50% vinyl versatate (Veova 10) is used as control binder. This latex is synthesized via an emulsion polymerization process using polyvinyl alcohol with a degree of hydrolysis of about 88% as protective colloid and potassium persulfate as radical initiator. The characteristics of this latex are:

| Dry extract: | 50.0% |
|---|---|
| pH: | 4.8 |
| MFFT: | 7.5° C. |
| Tg: | 15.5° C. |
| Brookfield viscosity at 50 rpm: | 3000 mPa · s |
| Granulometry: d50: | 1.9 μm |

11 kg of control latex are introduced into a 25-litre reactor equipped with an anchor-type stirrer. This latex is heated to a temperature of between 60 and 70° C., and 220 grams of Amgard TBEP or Amgard TOF are added over a period of about 20 minutes. After the end of addition of the Amgard, the mixture is maintained at this temperature for a further 20 to 30 minutes and is then cooled to room temperature.

The drying of the suspension was performed via a Niro-type atomization process. The attack air temperature is between 110 and 160° C. and preferably, herein, between 120 and 150° C., and the outlet temperature is between 50 and 90° C. and preferably, herein, between 60 and 80° C. The spraying of the polymer suspension is performed in the presence of mineral or organic fillers that improve the flowability of the product and prevent caking. These fillers may be, for example, carbonates, silicates, silica, double salts (talc or kaolin) or mixtures of these various fillers. The contents of these mineral fillers range from 2% to 20% and preferably, herein, between 5% and 15%.

Characteristics of the Latex Powders Forming the Subject of the Invention

Control Powder:

| % residual humidity: | 1% |
|---|---|
| Mean content of mineral agent: | 9.6% |
| Mean granulometry d50: | 74 μm |

Example of Latex Powder Supplemented with Amgard TBEP

| Content of Amgard/dry latex: | 4% |
|---|---|
| Latex characteristics: | |
| Dry extracts: | 50.8% |
| pH: | 4.8 |
| MFFT: | 0° C. |
| Brookfield viscosity at 50 rpm: | 3024 mPa · s |
| Granulometry: d50: | 1.9 μm |
| Powder characteristics: | |
| % residual humidity: | 1.2% |
| Mean content of mineral agent: | 12% |
| Mean granulometry d50: | 79 μm |

Example of Latex Powder Supplemented with Amgard TOF

| Content of Amgard/dry latex: | 4% |
|---|---|
| Latex characteristics: | |
| Dry extract: | 51.1% |
| pH: | 4.8 |
| MFFT: | 0° C. |
| Brookfield viscosity at 50 rpm: | 2968 mPa · s |
| Granulometry: d50: | 1.9 μm |
| Powder characteristics: | |
| % residual humidity: | 0.83% |
| Mean content of mineral agent: | 13% |
| Mean granulometry d50: | 62 μm |

Composition of the Formulation of the Rendering Used for the Bonding Mortar and the Base Rendering on Polystyrene

| Grey cement 42.5 R: | 600 g |
|---|---|
| Sand HN38 (0.4-4 mm) | 1295.7 g |
| Cellulose ether Culminal 9101: | 1 g |
| Cellulose ether Culminal 9104: | 3 g |
| Lime: | 40 g |
| Latex powder: | 60 g |

Water/powder ratio = 0.22

Results

Adhesion to Polystyrene

TABLE 4

| Reference | Adhesion 28 days (N/mm$^2$) | Adhesion 28 days + 2 days in water (N/mm$^2$) |
|---|---|---|
| Control powder | 0.09 | 0.015 |
| Control powder supplemented with Amgard TBEP | 0.128 | 0.035 |

TABLE 4-continued

| Reference | Adhesion 28 days (N/mm$^2$) | Adhesion 28 days + 2 days in water (N/mm$^2$) |
|---|---|---|
| Control powder supplemented with Amgard TOF | 0.108 | 0.029 |

The adhesion measured after 28 days and after curing in water is greater in the case of the mortars containing the control powders supplemented with Amgard TBEP and Amgard TOF compared with the mortar containing the non-supplemented control powder.

Water Uptake by Capillary Action on Stone

TABLE 5

| Time h$^{1/2}$ | Control powder water absorption (kg/m$^2$) | Control powder supplemented with Amgard TBEP Water absorption (kg/m$^2$) | Control powder supplemented with Amgard TOF Water absorption (kg/m$^2$) |
|---|---|---|---|
| 0.7 | 1.19 | 0.88 | 0.26 |
| 1 | 2.31 | 1.59 | 0.42 |
| 1.41 | 4.04 | 2.93 | 0.80 |
| 2 | 9.62 | 5.78 | 1.26 |
| 2.45 | 13.02 | 8.04 | 1.66 |
| 4.9 | 16.45 | 14.22 | 8.17 |

The amounts of water absorbed are less in the case of the mortars containing the control powders supplemented with Amgard TBEP and Amgard TOF compared with the mortar containing the non-supplemented control powder.

Example 3

Emulsion of Terpo+Additives

Estorob 1214: methyl ester of C10-C16 acid (CAS=66762-40-7) sold by the company Novance Montasolve CLP: cresol propoxylated with about 6 units of propylene oxide (CAS=9064-13-5) sold by the company SEPPIC Preparation of the Latex Forming the Subject of the Invention A latex composed of a copolymer of vinyl acetate/vinyl versatate and dibutyl maleate having a weight composition of 50% vinyl acetate, 50% vinyl versatate (Veova 10) and 25% dibutyl maleate is used as control binder. This latex is synthesized via an emulsion polymerization process using polyvinyl alcohol with a degree of hydrolysis of about 88% as protective colloid and potassium persulfate as free-radical initiator.

The characteristics of this latex are:

| Dry extract: | 50.73% |
|---|---|
| pH: | 4.7 |
| MFFT: | 5° C. |
| Tg: | 16° C. |
| Brookfield viscosity at 50 rpm: | 2420 mPa · s |
| Granulometry: d50: | 2 μm |

Characteristics of the Latex Forming the Subject of the Invention

Example of Terpo Control Latex

| | |
|---|---|
| Dry extract: | 50.73% |
| pH: | 4.7 |
| MFFT: | 5° C. |
| Brookfield viscosity at 50 rpm: | 2420 mPa·s |
| Granulometry: d50: | 2 μm |

Example of Control Latex Supplemented with Amgard TBEP

| | |
|---|---|
| Content of Amgard/dry latex: | 4% |
| Dry extract: | 52.0% |
| pH: | 4.8 |
| MFFT: | 0° C. |
| Brookfield viscosity at 50 rpm: | 1320 mPa·s |
| Granulometry: d50: | 2 μm |

Comparative Example

Control Latex Supplemented with Propoxylated Cresol (Montasolve CLP)

| | |
|---|---|
| Content of propoxylated cresol/dry latex: | 4% |
| Dry extract: | 51.9% |
| pH: | 4.8 |
| MFFT: | 0° C. |
| Brookfield viscosity at 50 rpm: | 1390 mPa·s |
| Granulometry: d50: | 2 μm |

Example of Control Latex Supplemented with Amgard TBEP and Estorob 1214

| | |
|---|---|
| Estorob 1214: | CAS = 66762-40-7 sold by the company Novance |
| Content of Amgard/dry latex: | 2% |
| Content of Estorob 1214: | 2% |
| Dry extract: | 51.9% |
| pH: | 4.8 |
| MFFT: | 0° C. |
| Brookfield viscosity at 50 rpm: | 1216 mPa·s |
| Granulometry: d50: | 2 μm |

Composition of the Rendering Formulation Used for the Bonding Mortar and the Base Rendering on the Polystyrene Example of Control Latex

| | |
|---|---|
| Grey cement 42.5 R: | 600 g |
| Sand HN38 (0.4-4 mm): | 1295.7 g |
| Cellulose ether Culminal 9101: | 1 g |
| Cellulose ether Culminal 9104: | 3 g |
| Lime: | 40 g |
| Emulsion of control latex: | 118.3 g |
| Water/powder ratio = 0.22 | |

Example of Control Latex Supplemented with Amgard TBEP

| | |
|---|---|
| Grey cement 42.5 R: | 600 g |
| Sand HN38 (0.4-4 mm): | 1295.7 g |
| Cellulose ether Culminal 9101: | 1 g |
| Cellulose ether Culminal 9104: | 3 g |
| Lime: | 40 g |
| Emulsion of latex supplemented with Amgard: | 116.3 g |
| Water/powder ratio = 0.22 | |

Comparative Example

Control Latex Supplemented with Propoxylated Cresol (Montasolve CLP)

| | |
|---|---|
| Grey cement 42.5 R: | 600 g |
| Sand HN38 (0.4-4 mm): | 1295.7 g |
| Cellulose ether Culminal 9101: | 1 g |
| Cellulose ether Culminal 9104: | 3 g |
| Lime: | 40 g |
| Emulsion of latex supplemented with propoxylated cresol: | 116.3 g |
| Water/powder ratio = 0.22 | |

Example of Control Latex Supplemented with Amgard TBEP and Estorob 1214

| | |
|---|---|
| Grey cement 42.5 R: | 600 g |
| Sand HN38 (0.4-4 mm): | 1295.7 g |
| Cellulose ether Culminal 9101: | 1 g |
| Cellulose ether Culminal 9104: | 3 g |
| Lime: | 40 g |
| Emulsion of latex supplemented with Amgard TBEP and Estorob 1214: | 116 g |
| Water/powder ratio - 0.22 | |

Results

Adhesion to Polystyrene

TABLE 6

| Reference | Adhesion 28 days (N/mm²) | Adhesion 28 days + 2 days in water (N/mm²) |
|---|---|---|
| Control emulsion | 0.061 | 0.006 |
| Control emulsion supplemented with propoxylated cresol (Montasolve CLP), comparative example | 0.104 | 0.027 |
| Control emulsion supplemented with Amgard TBEP | 0.132 | 0.052 |
| Control emulsion supplemented with Amgard TBEP and Estorob 1214 | 0.113 | 0.034 |

The adhesion to polystyrene measured after 28 days and curing in water in the case of the mortars containing the control emulsion and the control emulsion supplemented with propoxylated cresol is less than that measured in the case of the mortars containing the control emulsion supplemented with Amgard TBEP and the mixture Amgard TBEP plus Estorob 1214.

Water Uptake by Capillary Action on Stone

TABLE 7

| Time $h^{1/2}$ | Control emulsion Water absorption (kg/m$^2$) | Control emulsion supplemented with propoxylated cresol Water absorption (kg/m$^2$) | Control emulsion supplemented with Amgard TBEP Water absorption (kg/m$^2$) | Control emulsion supplemented with Amgard TBEP and Estorob 1214 Water absorption (kg/m$^2$) |
|---|---|---|---|---|
| 0.7 | 1.92 | 0.40 | 0.58 | 0.15 |
| 1 | 3.44 | 0.55 | 0.76 | 0.21 |
| 1.41 | 6.56 | 1.17 | 1.32 | 0.29 |
| 2 | 11.71 | 3.89 | 2.92 | 0.42 |
| 2.45 | 14.60 | 7.08 | 4.57 | 0.58 |
| 4.9 | 16.78 | 15.47 | 12.70 | 2.46 |

The amounts of water absorbed are less in the case of the mortar containing the control emulsion supplemented with the mixture of Amgard TBEP and Estorob 1214.

Example 4

Control/BEHPA Powder Mixture

BEHPA: bis(2-ethylhexyl)phosphoric acid (CAS=298-07-7) sold by the company Rhodia
Preparation of the Mixture
BEHPA (0.5% by weight/latex powder) is premixed with the latex powder before introduction into the mixture containing the various fillers.
Composition of the Rendering Formulation Used for the Bonding Mortar and the Base Rendering on Polystyrene

| | |
|---|---|
| Grey cement 42.5 R: | 600 g |
| Sand HN38 (0.4-4 mm) | 1295.4 g |
| Cellulose ether Culminal 9101: | 1 g |
| Cellulose ether Culminal 9104: | 3 g |
| Lime: | 40 g |
| Latex powder: | 60 g |
| BEHPA: | 0.3 g |
| Water/powder ratio = 0.22 | |

Results
Adhesion to Polystyrene

TABLE 8

| Reference | Adhesion 28 days (N/mm$^2$) | Adhesion 28 days + 2 days in water (N/mm$^2$) |
|---|---|---|
| Control powder | 0.127 | 0.014 |
| Control powder mixed with BEHPA | 0.143 | 0.041 |

The adhesion to polystyrene measured after 28 days and after curing in water is greater in the case of the mortar containing the control powder mixed with BEHPA compared with the non-supplemented control powder.

Water Uptake by Capillary Action on Stone

TABLE 9

| Time $h^{1/2}$ | Control powder Water absorption (kg/m$^2$) | Control powder mixed with BEHPA Water absorption (kg/m$^2$) |
|---|---|---|
| 0.7 | 5.35 | 1.71 |
| 1 | 7.52 | 2.81 |
| 1.41 | 12.31 | 7.14 |

TABLE 9-continued

| Time $h^{1/2}$ | Control powder Water absorption (kg/m$^2$) | Control powder mixed with BEHPA Water absorption (kg/m$^2$) |
|---|---|---|
| 2 | 17.78 | 10.92 |
| 2.45 | 18.03 | 13.95 |
| 4.9 | 18.44 | 17.61 |

The amount of water absorbed is less in the case of the mortar containing the control powder mixed with BEHPA compared with the mortar containing the non-supplemented control powder.

The invention claimed is:

1. An article of construction comprising a heat-insulating material adhered to a mineral building material and an adhesion promoting agent comprising a phosphate monoester, diester, trimester, or a mixture thereof, and the phosphate monoester, diester, or trimester is represented by the formula:

$$O=P(OR1)(OR2)(OR3)$$

wherein R1, R2 and R3, may be the same or different and are a hydrogen atom, a linear, branched or cyclic, saturated or unsaturated alkyl radical containing from 1 to 22 carbon atoms, optionally substituted with halogen atoms, hydroxyl groups, ether groups containing between 1 and 12 carbon atoms, thioether groups, ester groups, amide groups, carboxyl groups, sulfonic acid groups, carboxylic anhydride groups, carbonyl groups, an aryl radical containing from 6 to 22 carbon atoms, optionally substituted with halogen atoms, and at least one of R1, R2 or R3 is not a hydrogen atom, and wherein the adhesion promoting agent is adsorbed onto an inert mineral support selected from the group consisting of silica, alumina, silica-alumina, sodium silicoaluminate, calcium silicate, magnesium silicate, zirconia, magnesium oxide, calcium oxide, cerium oxide and titanium oxide.

2. The article of construction of claim 1 wherein the phosphate monoester, diester or trimester of formula (I) is selected from the group consisting of tris(2-ethylhexyl) phosphate, tris(2-butoxyethyl) phosphate, di(2-ethylhexyl) phosphate, mono(2-ethylhexyl) phosphate, tris(2-isooctyl) phosphate, tricresyl phosphate, cresyl diphenyl phosphate, trixylyl phosphate, triphenyl phosphate, tributyl phosphate, triethyl phosphate, tris(2-chloroethyl) phosphate, and combinations thereof.

3. The article of construction of claim 1 wherein the adhesion promoting agent is in a water-insoluble film-forming polymer composition.

4. The article of construction of claim 1 wherein the adhesion promoting agent is in a mineral binder composition.

5. The article of construction of claim 1 wherein the heat insulating material comprises a component select from the group consisting of mineral wools, polystyrene and polyurethane.

6. The article of construction of claim 1 wherein the mineral building material is selected from the group consisting of masonry, concrete, mineral renderings, and mortar.

7. The article of construction of claim 1 wherein the article of construction serves to interrupt a thermal bridge.

8. The article of construction of claim 3 wherein the water-insoluble film forming composition is in the form of an aqueous dispersion (latex) or is in the form of a redispersible latex powder.

9. The article of construction of claim 3 wherein the polymer composition is obtained by polymerization of monomers selected from the group consisting of vinyl esters of branched or unbranched, saturated monocarboxylic acids containing from 1 to 16 carbon atoms, alkyl acrylates and methacrylates, the alkyl group of which contains from 1 to 10 carbon atoms, vinylaromatic monomers, wherein the monomers are copolymerized with each other or with other ethylenically unsaturated.

10. The article of construction of claim 8 wherein the phosphate monoester, diester, trimester, or a mixture thereof, is present in an amount between 0.02% and 25% by weight relative to the weight of the latex powder.

11. The article of construction of claim 10 wherein the phosphate monoester, diester, trimester, or a mixture thereof, is present in an amount between 1% and 5% by weight relative to the weight of the latex powder.

12. The article of construction of claim 4 wherein the mineral binder is a hydraulic binder selected from the group consisting of cements, aluminous or blast-furnace type, fly ash, calcined shales and pozzolans and wherein the amount of phosphate monoester, diester or triester is between 0.01% and 50% by dry weight of phosphate monoester, diester or triester relative to the total weight of the composition.

13. The article of construction of claim 12 wherein the amount of phosphate monoester, diester or triester is between 0.02% and 2% by dry weight of the phosphate monoester, diester or triester relative to the total weight of the composition.

14. The article of construction of claim 5 wherein the heat insulating material is polystyrene.

15. The article of construction of claim 14 wherein the polystyrene is extruded or expanded polystyrene.

16. The article of construction of claim 6 wherein the mineral building material is a substrate for ceramic tiles or a facade.

17. A method of preparing an article of construction of claim 1 wherein the adhesion promoter is applied to a surface in the form of a primer.

18. The method of claim 17 wherein the surface is a surface of a heat insulating material.

* * * * *